United States Patent
Lee

(10) Patent No.: US 11,461,799 B2
(45) Date of Patent: Oct. 4, 2022

(54) SYSTEM AND METHOD WITH STREAMING-BASED REWARD PROVIDING SERVER

(71) Applicant: Hyun Ho LEE, Daegu (KR)

(72) Inventor: Hyun Ho Lee, Daegu (KR)

( * ) Notice: Subject to any disclaimer, the term of this patent is extended or adjusted under 35 U.S.C. 154(b) by 0 days.

(21) Appl. No.: 17/192,988

(22) Filed: Mar. 5, 2021

(65) Prior Publication Data

US 2021/0279759 A1  Sep. 9, 2021

(30) Foreign Application Priority Data

Mar. 5, 2020 (KR) .................. 10-2020-0027879

(51) Int. Cl.
*G06Q 30/00* (2012.01)
*G06Q 30/02* (2012.01)
*H04N 21/24* (2011.01)
*H04N 21/4784* (2011.01)

(52) U.S. Cl.
CPC ..... *G06Q 30/0226* (2013.01); *G06Q 30/0201* (2013.01); *G06Q 30/0215* (2013.01); *G06Q 30/0235* (2013.01); *H04N 21/24* (2013.01); *H04N 21/4784* (2013.01)

(58) Field of Classification Search
CPC . G06Q 30/0201–0277; H04N 21/4784; H04N 21/25841; H04N 21/812
See application file for complete search history.

(56) References Cited

U.S. PATENT DOCUMENTS

| | | | |
|---|---|---|---|
| 8,213,916 B1* | 7/2012 | Yankovich | H04N 21/44008 455/414.3 |
| 9,462,028 B1* | 10/2016 | Levinson | H04L 65/765 |
| 10,007,476 B1* | 6/2018 | Glikmann | H04L 65/612 |
| 10,395,292 B1* | 8/2019 | Graham | G06Q 30/0623 |
| 11,331,578 B2* | 5/2022 | Khan | A63F 13/216 |
| 2010/0079338 A1* | 4/2010 | Wooden | G06Q 30/0241 342/357.64 |

(Continued)

FOREIGN PATENT DOCUMENTS

| KR | 10-2011-0016733 A | 2/2011 |
|---|---|---|
| KR | 10-1145877 B1 | 5/2012 |

(Continued)

*Primary Examiner* — Luis A Brown
(74) *Attorney, Agent, or Firm* — NSIP Law

(57) ABSTRACT

A streaming-based reward providing server includes: a destination location coordinate value inputter configured to receive a destination location coordinate value according to a user's input; a confirmation radius setter configured to set an arrival confirmation radius having a radius of a threshold value preset based on the destination location coordinate value; a reward amount inputter configured to receive a reward amount according to the user's input; a location coordinate value collector configured to collect a streamer location coordinate value from a terminal performing streaming broadcast; a trigger signal generator configured to generate a trigger signal; a reward acquisition signal generator configured to generate a reward acquisition signal; a participation rate calculation module configured to calculate a viewer participation rate for each viewer; and a reward calculator configured to calculate and output a viewer reward value for each viewer.

13 Claims, 4 Drawing Sheets

(56) References Cited

U.S. PATENT DOCUMENTS

| | | | | |
|---|---|---|---|---|
| 2010/0332310 A1* | 12/2010 | Russell | G06Q 30/02 | |
| | | | | 715/810 |
| 2013/0217333 A1* | 8/2013 | Sprigg | G06Q 30/02 | |
| | | | | 455/41.2 |
| 2013/0332254 A1* | 12/2013 | Yu | G06Q 30/0226 | |
| | | | | 705/14.27 |
| 2014/0278946 A1* | 9/2014 | Powell | G06Q 30/0248 | |
| | | | | 705/14.47 |
| 2015/0269600 A1* | 9/2015 | Randle | G06Q 30/0211 | |
| | | | | 705/14.14 |
| 2017/0195837 A1* | 7/2017 | Archer | H04W 4/023 | |
| 2017/0213233 A1* | 7/2017 | High | G06Q 20/387 | |
| 2017/0221268 A1* | 8/2017 | Bess | H04W 4/029 | |
| 2017/0264919 A1* | 9/2017 | Amine | H04N 21/251 | |
| 2018/0365722 A1* | 12/2018 | Jack | G06Q 20/065 | |
| 2019/0080342 A1* | 3/2019 | Andon | H04W 4/21 | |
| 2019/0147311 A1* | 5/2019 | Purba | G06K 19/07713 | |
| | | | | 340/572.1 |
| 2020/0357233 A1* | 11/2020 | Ma | G07F 17/3241 | |
| 2021/0279759 A1* | 9/2021 | Lee | H04N 21/812 | |

FOREIGN PATENT DOCUMENTS

| | | |
|---|---|---|
| KR | 10-2012-0089934 A | 8/2012 |
| KR | 10-1939130 B1 | 1/2019 |
| KR | 10-2019-0061871 A | 6/2019 |

* cited by examiner

SYSTEM AND METHOD WITH STREAMING-BASED REWARD PROVIDING SERVER

CROSS REFERENCE TO RELATED APPLICATION

This application claims the benefit under 35 USC 119(a) of Korean Patent Application No. 10-2020-0027879, filed Mar. 5, 2020, the entire contents of which is incorporated herein by reference for all purposes.

BACKGROUND

1. Field

The present disclosure relates to a system and method with streaming-based reward providing server.

2. Description of Related Art

Over the top (OTT) video service is a service that provides video content to users through the Internet network, and provides a variety of video content, reflecting personal preferences, such as movies, dramas, and me-media.

According to Grand View Research (in 2018), a global market research organization, a global OTT service market size is expected to grow at an annual average of 15.8% annually after 2020, and to $124.3 billion in 2025.

As OTT services are expanding, while reflecting the characteristics of consumer media, a customized interactive advertising service using influencers, such as popular You-Tubers in a mobile-oriented market environment, is in the spotlight as an advertisement means.

Accordingly, technology that provides streaming advertisements based on location, and technology that provides streaming videos including advertisement videos have been proposed, but in the conventional streaming advertisement technologies, there is a problem in that the same rewards are provided to both a viewer who participates in an event near a time point of occurrence of a reward, and a viewer who has been participating in the event from a time point before the occurrence of the reward.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a streaming-based reward providing server includes a destination location coordinate value inputter configured to receive a destination location coordinate value according to a user's input, a confirmation radius setter configured to set an arrival confirmation radius having a radius of a threshold value preset based on the destination location coordinate value, a reward amount inputter configured to receive a reward amount according to the user's input, a location coordinate value collector configured to collect a streamer location coordinate value from a terminal performing streaming broadcast, a trigger signal generator configured to generate a trigger signal upon receiving a signal from the terminal performing the streaming broadcast, a reward acquisition signal generator configured to generate a reward acquisition signal when the streamer location coordinate value falls within the arrival confirmation radius, a participation rate calculation module configured to calculate a viewer participation rate for each viewer, on the basis of a viewing time for each viewer according to viewer's use of video data in a plurality of sections generated by dividing an interval, between a time point when the trigger signal is generated and a time point when the reward acquisition signal is generated, by a preset intermediate time point setting period, and a reward calculator configured to calculate and output a viewer reward value for each viewer on the basis of a value obtained by multiplying the viewer participation rate for each viewer and the reward amount.

The streaming-based reward providing server may further include a viewing time collector configured to collect the viewing time for each viewer according to the viewer's use of the video data for each of the plurality of sections. The participation rate calculation module may include a section generator configured to generate the plurality of sections by respectively dividing intervals into each section, the intervals including an interval between the time point when the trigger signal is generated and a time point when a first intermediate time point is firstly generated, an interval between the first intermediate time point and a second intermediate time point generated after the first intermediate time point, and an interval between the time point when the reward acquisition signal is generated and the second intermediate time point generated just before the time point when the reward acquisition signal is generated, and a participation rate calculator configured to calculate the viewer participation rate for each viewer on the basis of the viewing time for each viewer for each of the plurality of sections.

The streaming-based reward providing server may further include a feedback reception time point collector configured to receive each feedback reception time point for each viewer according to the user's input. The participation rate calculator may calculate the viewer participation rate for each viewer on the basis of the viewing time for each viewer for each of the plurality of sections and the number of feedback reception time points for each viewer, the feedback reception time points belonging to each of the plurality of sections.

The streaming-based reward providing server may further include an intermediate time point generator configured to generate at least one intermediate time point in each intermediate time point setting period from the time point when the trigger signal is generated, a radius setter configured to set an initial radius having a radius of a preset initial value at the time point when the trigger signal is generated, and set an intermediate time point radius having a radius smaller than the radius of the initial radius, on the basis of a separation distance between the streamer location coordinate value and the destination location coordinate value for each intermediate time point, and a target coordinate value generator configured to generate an initial target coordinate value corresponding to any one coordinate belonging to the initial radius from the destination location coordinate value after the time point when the trigger signal is generated, and generate and output an intermediate target coordinate value, corresponding to any one coordinate falling within the intermediate time point radius, from the destination location coordinate value when the intermediate time point is generated by the intermediate time point generator and the intermediate time point radius corresponding to the intermediate time point is set in the radius setter.

The streaming-based reward providing server of may further include a reward distribution rate inputter configured to receive a reward distribution rate between a streamer and a viewer according to the user's input. The reward calculator may calculate a streamer reward value and a total viewer reward value from the reward amount on the basis of a reward amount distribution rate between the streamer and the viewer, calculate the viewer reward value for each viewer according to a value obtained by multiplying the total viewer reward value by the viewer participation rate for each viewer, and output the streamer reward value and the viewer reward value for each viewer.

In another general aspect, a streaming-based reward providing system includes a streamer terminal configured to film a video according to a user's input and transmit video data, generated by the filming of the video, to outside, a viewer terminal configured to transmit a streaming request signal to receive the video data by streaming, and transmit feedback on the video data, a streaming server configured to receive and store the video data from the streamer terminal, receive the streaming request signal from the viewer terminal to detect a viewing time for each viewer as the video data is provided to the viewer terminal, and detect a feedback reception time point for each viewer as the feedback is received from the viewer terminal, and a reward providing server configured to receive a destination location coordinate value and a reward amount according to the user's input, set an arrival confirmation radius having a radius of a threshold value preset based on the destination location coordinate value, collect a streamer location coordinate value from the streamer terminal, generate a trigger signal as a signal is received from the streamer terminal, generate a reward acquisition signal when the streamer location coordinate value falls within the arrival confirmation radius, calculate a viewer participation rate for each viewer on the basis of the viewing time for each viewer, according to viewer's use of the video data, in a plurality of sections generated by dividing an interval, between a time point when the trigger signal is generated and a time point when the reward acquisition signal is generated, by an intermediate time point setting period, and calculate and output a viewer reward value for each viewer on the basis of a value obtained by multiplying the viewer participation rate for each viewer and the reward amount.

The reward providing server may include a destination location coordinate value inputter configured to receive the destination location coordinate value according to the user's input, a confirmation radius setter configured to set the arrival confirmation radius having the radius of the threshold value preset based on the destination location coordinate value, a reward amount inputter configured to receive the reward amount according to the user's input, a location coordinate value collector configured to collect the streamer location coordinate value from a terminal performing streaming broadcast, a trigger signal generator configured to generate the trigger signal upon receiving a signal from the terminal performing the streaming broadcast, a reward acquisition signal generator configured to generate the reward acquisition signal when the streamer location coordinate value falls within the arrival confirmation radius, a participation rate calculation module configured to calculate the viewer participation rate for each viewer, on the basis of the viewing time for each viewer according to the viewer's use of the video data in the plurality of sections generated by dividing the interval, between the time point when the trigger signal is generated and the time point when the reward acquisition signal is generated, by the preset intermediate time point setting period, and a reward calculator configured to calculate and output the viewer reward value for each viewer on the basis of the value obtained by multiplying the viewer participation rate for each viewer and the reward amount.

The streaming-based reward providing system may further include a viewing time collector configured to collect the viewing time for each viewer according to the viewer's use of the video data for each of the plurality of sections. The participation rate calculation module may include a section generator configured to generate the plurality of sections by respectively dividing intervals into each section, the intervals including an interval between the time point when the trigger signal is generated and a time point when a first intermediate time point is firstly generated, an interval between the first intermediate time point and a second intermediate time point generated after the first intermediate time point, and an interval between the time point when the reward acquisition signal is generated and the second intermediate time point generated just before the time point when the reward acquisition signal is generated, and a participation rate calculator configured to calculate the viewer participation rate for each viewer on the basis of the viewing time for each viewer for each of the plurality of sections.

The streaming-based reward providing system may further include a feedback reception time point collector configured to receive each feedback reception time point for each viewer according to the user's input. The participation rate calculator may calculate the viewer participation rate for each viewer on the basis of the viewing time for each viewer for each of the plurality of sections and the number of feedback reception time points for each viewer, the feedback reception time points belonging to each of the plurality of sections.

The reward providing server may further include an intermediate time point generator configured to generate at least one intermediate time point in each intermediate time point setting period from the time point when the trigger signal is generated, a radius setter configured to set an initial radius having a radius of a preset initial value at the time point when the trigger signal is generated, and set an intermediate time point radius, having a radius smaller than the radius of the initial radius, on the basis of a separation distance between the streamer location coordinate value and the destination location coordinate value for each intermediate time point, and a target coordinate value generator configured to generate an initial target coordinate value corresponding to any one coordinate falling within the initial radius from the destination location coordinate value after the time point when the trigger signal is generated, and generate and output an intermediate target coordinate value, corresponding to any one coordinate that falls within the intermediate time point radius, from the destination location coordinate value when the intermediate time point is generated by the intermediate time point generator and the intermediate time point radius corresponding to the intermediate time point is set in the radius setter.

The reward providing server may further include a reward distribution rate inputter configured to receive a reward distribution rate between a streamer and a viewer according to the user's input. The reward calculator may calculate a streamer reward value and a total viewer reward value from the reward amount on the basis of a reward amount distribution rate between the streamer and the viewer, calculate the viewer reward value for each viewer according to a value obtained by multiplying the total viewer reward value by the viewer participation rate for each viewer, and output the streamer reward value and the viewer reward value for each viewer.

In another general aspect, a server includes one or more processors configured to receive a destination location coordinate value according to a user's input, set an arrival confirmation radius having a radius of a threshold value preset based on the destination location coordinate value, receive a reward amount according to the user's input, collect a streamer location coordinate value from a terminal performing streaming broadcast, generate a trigger signal upon receiving a signal from the terminal performing the streaming broadcast, generate a reward acquisition signal when the streamer location coordinate value falls within the arrival confirmation radius, calculate a viewer participation rate for each viewer, on the basis of a viewing time for each viewer according to viewer's use of video data in a plurality of sections generated by dividing an interval, between a time point when the trigger signal is generated and a time point when the reward acquisition signal is generated, by a preset intermediate time point setting period, and calculate and output a viewer reward value for each viewer on the basis of a value obtained by multiplying the viewer participation rate for each viewer and the reward amount.

The server may further include a memory configured to store instructions. The one or more processors may be further configured to execute the instructions to configure the one or more processors to receive the destination location coordinate value according to the user's input, set the arrival confirmation radius having the radius of the threshold value preset based on the destination location coordinate value, receive the reward amount according to the user's input, collect the streamer location coordinate value from the terminal performing streaming broadcast, generate the trigger signal upon receiving the signal from the terminal performing the streaming broadcast, generate the reward acquisition signal when the streamer location coordinate value falls within the arrival confirmation radius, calculate the viewer participation rate for each viewer, on the basis of the viewing time for each viewer according to viewer's use of video data in the plurality of sections generated by dividing the interval, between the time point when the trigger signal is generated and the time point when the reward acquisition signal is generated, by the preset intermediate time point setting period, and calculate and output the viewer reward value for each viewer on the basis of the value obtained by multiplying the viewer participation rate for each viewer and the reward amount.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
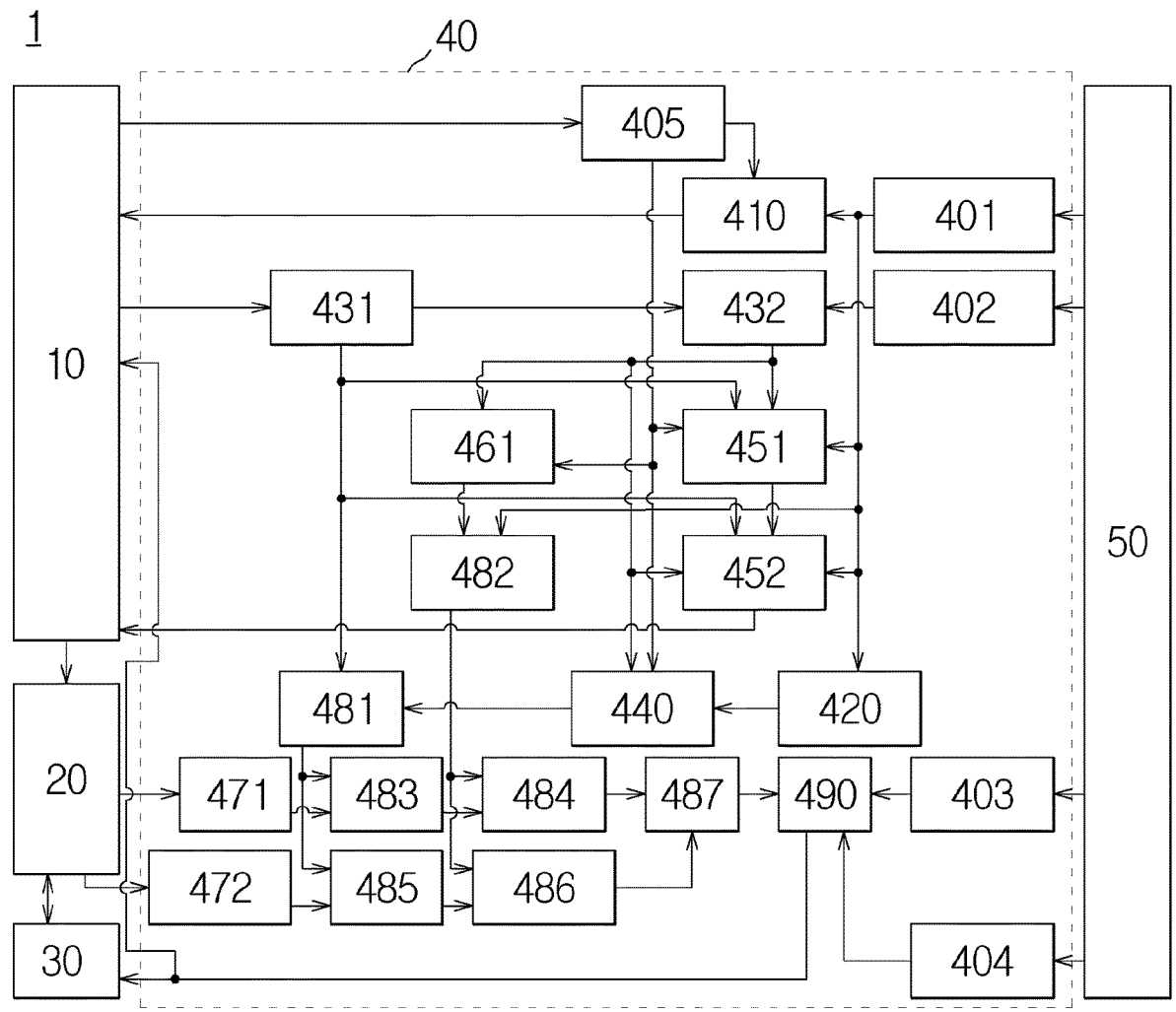
FIG. 1 is a block diagram of an example of a streaming-based reward providing system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

The present disclosure relates to a streaming-based reward providing server, and a system and method thereof and, more particularly, to a streaming-based reward providing system and method, wherein a participation rate for an individual viewer is calculated according to a viewer's viewing time and feedback time points, and rewards are differentially paid according to the participation rate.

An objective of the present disclosure is to solve the above problem, and to provide a streaming-based reward providing server, and a system and method thereof, wherein a participation rate for an individual viewer is calculated according to a viewer's viewing time and feedback time points, and rewards are differentially paid according to the participation rate.

The objective of the present disclosure is not limited to the objective mentioned above, and other objectives not mentioned herein will be clearly understood from the following description.

FIG. 1 is a block diagram of an example of a streaming-based reward providing system.

In FIG. 1, the streaming-based reward providing system 1 may include a streamer terminal 10, a streaming server 20, a viewer terminal 30, a reward providing server 40, and a manager terminal 50. The use of the term 'may' herein with respect to an example or embodiment, e.g., as to what an example or embodiment may include, implement, or achieve means that at least one example or embodiment exists with such a feature, implementation, or achievement, while also noting that all examples and embodiments are not limited thereto and alternate examples or embodiments may also exist.

The streamer terminal 10 may film a video according to a user's input and transmit video data generated by the filming of the video to the outside.

The streaming server 20 may receive and store the video data from the streamer terminal 10, receive a streaming request signal from the viewer terminal 30 to calculate a viewing time for each viewer as the video data is provided to the viewer terminal 30, and detect a feedback reception time point for each viewer as feedback is received from the viewer terminal 30.

The streaming server 20 may identify a viewer on the basis of a viewer ID, a viewer identification code, and the like according to a user's input, and calculate a viewing time for each viewer.

The viewer terminal 30 may transmit the streaming request signal to the streaming server 20 according to the user's input to receive the video data by streaming, and transmit the feedback on the video data, according to the user's input, to the streaming server 20.

The reward providing server 40 may receive a destination location coordinate value and a reward amount according to the user's input, set an arrival confirmation radius having a radius of a threshold value preset based on the destination location coordinate value, receive and collect a streamer location coordinate value from the streamer terminal 10, generate a trigger signal as a signal is received from the streamer terminal 10, generate a reward acquisition signal when the streamer location coordinate value falls within the arrival confirmation radius, calculate a viewer participation rate for each viewer on the basis of the viewing time for each viewer, according to viewer's use of the video data, in a plurality of sections generated by dividing an interval, between a time point when the trigger signal is generated and a time point when a reward acquisition signal is generated, by an intermediate time point setting period, and calculate and output a viewer reward value for each viewer on the basis of a value obtained by multiplying the viewer participation rate for each viewer and the reward amount.

The streaming-based reward providing server 40 may include: a destination location coordinate value inputter 401; an intermediate time point setting period inputter 402; a reward amount inputter 403; a reward distribution rate inputter 404; a location coordinate value collector 405; a reward notification signal generator 410; a confirmation radius setter 420; a trigger signal generator 431; an intermediate time point generator 432; a reward acquisition signal generator 440; a radius setter 451; a target coordinate value generator 452; a coordinate information generator 461; a viewing time collector 471; a feedback reception time point collector 472; a participation rate calculation module 480; and a reward calculator 490.

The destination location coordinate value inputter 401 may receive a destination location coordinate value according to a user's input.

The intermediate time point setting period inputter 402 may receive an intermediate time point setting period according to the user's input.

The reward amount inputter 403 may receive a reward amount according to the user's input.

The reward amount inputter 403 may receive the reward amount, as an amount of compensation for rewarding a streamer and a viewer, according to the user's input, when a streamer location coordinate value falls within a range of values including: a destination location coordinate value that is input through the destination location coordinate value inputter 401; and a preset threshold distance value.

The reward distribution rate inputter 404 may receive a reward distribution rate between the streamer and the viewer according to the user's input.

The location coordinate value collector 405 may receive and collect a streamer location coordinate value from the streamer terminal 10 performing streaming broadcast.

The reward notification signal generator 410 may generate a reward notification signal, when a separation distance between the streamer location coordinate value and the destination location coordinate value falls within a preset threshold distance value.

The reward notification signal generator 410 may generate the reward notification signal, when the separation distance between the streamer location coordinate value and the destination location coordinate value falls within the preset threshold distance value, so as to notify the existence of the reward to the streamer terminal 10.

The confirmation radius setter 420 may set an arrival confirmation radius having a radius of a threshold value preset based on the destination location coordinate value.

The arrival confirmation radius is for determining whether the streamer location coordinate value reaches the destination location coordinate value, and may have the radius of the threshold value preset based on the destination location coordinate value.

The trigger signal generator 431 may generate a trigger signal according to a signal for participating in a reward program and being received based on a user's input from the streamer terminal 10 performing streaming broadcast.

The intermediate time point generator 432 may generate at least one intermediate time point in every intermediate time point setting period from the time point when the trigger signal is generated.

The reward acquisition signal generator 440 may generate the reward acquisition signal when the streamer location coordinate value falls within the arrival confirmation radius.

The radius setter 451 may set an initial radius having a radius of a preset initial value at a time point when the trigger signal is generated, and set an intermediate time point radius having a radius smaller than that of the initial radius, on the basis of a separation distance between the streamer location coordinate value and the destination location coordinate value for each intermediate time point.

When the intermediate time point is first generated by the intermediate time point generator 432 and the streamer location coordinate value at the intermediate time point falls within the initial radius, but not within the arrival confirmation radius, the radius setter 451 may set the intermediate time point radius having a radius resulting from reducing the radius of the initial radius by a preset length.

When the intermediate time point is generated by the intermediate time point generator 432, and the streamer location coordinate value at the intermediate time point falls within the intermediate time point radius, but not within the arrival confirmation radius, the radius setter 451 may reset the intermediate time point radius so as to allow the intermediate time point radius to have a radius thereof reduced by the preset length.

The target coordinate value generator 452 may generate an initial target coordinate value corresponding to any one coordinate belonging to the initial radius from the destination location coordinate value after the time point when the trigger signal is generated.

When the intermediate time point is generated by the intermediate time point generator 432, and the intermediate time point radius corresponding to the intermediate time point is set in the radius setter 451, the target coordinate value generator 452 may generate an intermediate target coordinate value, corresponding to any one coordinate that falls within the intermediate time point radius, from the destination location coordinate value.

The target coordinate value generator 452 may generate and output a target coordinate value to the streamer terminal 10.

According to the above-described configuration, in the streaming-based reward providing server 40, the target coordinate value generator 452 may gradually provide a target coordinate close to the destination location coordinate value depending on whether or not the streamer position coordinate value falls within a preset radius for each preset intermediate time point setting period.

The coordinate information generator 461 may generate intermediate time point coordinate information generated by matching the streamer location coordinate value with the intermediate time point at the intermediate time point for each intermediate time point.

The viewing time collector 471 may collect a viewing time for each viewer according to the viewer's use of the video data.

The viewing time for each viewer may refer to a time when the streaming server 20 receives a streaming request signal from a viewer terminal 30 and provides the video data to the viewer terminal 30 through streaming.

The feedback reception time point collector 472 may receive each feedback reception time point for each viewer according to the user's input.

The feedback reception time point may refer to a time point when the streaming server 20 receives the feedback on the video data according to the user's input from the viewer terminal 30.

When the reward acquisition signal is generated, the participation rate calculation module 480 may calculate a viewer participation rate for each viewer, on the basis of both the viewing time for each viewer according to the viewer's use of the video data and the feedback reception time point for each viewer according to the user's input, in a plurality of sections generated by dividing an interval, between a time point when a trigger signal is generated and a time point when a reward acquisition signal is generated, by a preset intermediate time point setting period.

The participation rate calculation module 480 may include a section generator 481, a weight generator 482, a first counter 483, a viewing participation value calculator 484, a second counter 485, a feedback participation value calculator 486, and a participation rate calculator 487.

The section generator 481 may generate a plurality of sections by respectively dividing intervals into each section, the intervals including: an interval between the time point when the trigger signal is generated and a time point when a first intermediate time point is firstly generated after the trigger signal is generated; an interval between the first intermediate time point and a second intermediate time point set after the corresponding first intermediate time point; and an interval between a time point when a reward acquisition signal is generated and the second intermediate time point generated just before the time point when the reward acquisition signal is generated.

The weight generator 482 may generate a weight for each section, on the basis of the separation distance between the streamer location coordinate value and the destination location coordinate value, for each intermediate time point.

The weight generator 482 may generate a weight having a preset first weight value when a separation distance between the streamer location coordinate value and the destination location coordinate value at the intermediate time point is greater than or equal to a preset first distance value.

The weight generator 482 may generate a weight having a second weight value greater than the first weight value when the separation distance between the streamer location coordinate value and the destination location coordinate value at the intermediate time point falls within the first distance value and is greater than or equal to the second distance value smaller than the first distance value.

The weight generator 482 may generate a weight having a third weight value greater than the second weight value when the separation distance between the streamer location coordinate value and the destination location coordinate value at the intermediate time point falls within the second distance value and is greater than or equal to the third distance value smaller than the second distance value.

At least one of the second distance value, the third distance value, the second weight value, and the third weight value may be preset according to a user's input.

The weight generator 482 may generate a weight having a larger weight value among the preset weight values, when a separation distance between the streamer location coordinate value and the destination location coordinate value decreases at an intermediate time point included in each section of the plurality of sections.

The first counter 483 may count a viewing counting value so that the viewing counting value having a preset initial value increases by a preset value when the viewing time for each viewer for each of the plurality of sections exceeds the preset threshold value.

The first counter 483 may count a viewing counting value so that the viewing counting value having a preset initial value increases by a preset value when a viewing time for each viewer exceeds a preset threshold value, the viewing time applying for a section, in which the start time point is the time point when the trigger signal is generated and the end time point is the time point when the first intermediate time point is firstly generated after the time point when the trigger signal is generated, among the plurality of sections.

The first counter 483 may count the viewing counting value so that the viewing counting value increases by the preset value when a viewing time for each viewer exceeds the preset threshold value, the viewing time applying for a section, in which the start time point is the first intermediate time point and the end time point is the second intermediate time point set after the corresponding first intermediate time point, among the plurality of sections.

Here, the threshold value may be set according to a value obtained by multiplying a preset ratio value and the intermediate time point setting period.

For example, the threshold value may be set according to the value obtained by multiplying a ratio value of 70% and the intermediate time point setting period, but is not limited thereto.

The first counter 483 may count the viewing counting value so that the viewing counting value increases by the preset value when a viewing time for each viewer exceeds the preset threshold value, the viewing time applying for a section, in which the end time point is a time point when a reward acquisition signal is generated and the start time point is the second intermediate time point generated just before the time point when the reward acquisition signal is generated, among the plurality of sections.

Among the plurality of sections, for the section where the end time point is the time point when the reward acquisition signal is generated and the start time point is the intermediate time point generated just before the time point when the reward acquisition signal is generated, a threshold value may be set according to a value obtained by multiplying a time interval, between the time point when the reward acquisition signal is generated and the intermediate time point generated just before the time point when the reward acquisition signal is generated, by the preset ratio value.

For example, the threshold value may be set according to a value obtained by multiplying the time interval, between the time point when the reward acquisition signal is generated and the intermediate time point generated just before the time point when the reward acquisition signal is generated, by a ratio value of 70%, but is not limited thereto.

The viewing participation value calculator 484 may calculate a viewing participation value for each viewer by accumulating a value obtained by multiplying a viewing counting value and a weight for each section corresponding to each of the plurality of sections.

The second counter 485 may generate a feedback counting value for each section on the basis of the number of feedback reception time points for each viewer, the feedback reception time points belonging to each of the plurality of sections.

The feedback counting value for each section may be a value depending on the number of feedback reception time points for each viewer, the feedback reception time points belonging to each of the plurality of sections.

The feedback participation value calculator 486 may calculate a feedback participation value for each viewer by accumulating a value obtained by multiplying, for each section, a weight for each section corresponding to each of the plurality of sections and the feedback counting value.

The participation rate calculator 487 may calculate a viewer participation rate for each viewer on the basis of a ratio between the maximum value among viewing participation values for each viewer and a viewing participation value of any one viewer.

The participation rate calculator 487 may calculate the viewer participation rate for each viewer on the basis of ratios including: a ratio between the maximum value among viewing participation values for each viewer and the viewing participation value of any one viewer; and a ratio between the maximum value among feedback participation values for each viewer and a feedback participation value of any one viewer.

The participation rate calculator 487 may calculate a viewer participation rate for each viewer terminal by adding: a value obtained by multiplying the preset first constant value and the ratio between the maximum value among viewing participation values for each viewer and the viewing participation value of any one viewer; and a value obtained by multiplying the preset second constant value by the ratio between the maximum value among feedback participation values for each viewer and the feedback participation value of any one viewer.

In the streaming-based reward providing server 40, the participation rate calculator 487 may calculate a viewer participation rate for each viewer on the basis of values including: a viewing participation value for each viewer calculated based on the viewing time for each viewer according to the viewer's use of video data for each of the plurality of sections; and a feedback participation value for each viewer calculated based on the number of feedback reception time points for each viewer, the feedback reception time points belonging to each of the plurality of sections.

The reward calculator 490 may calculate and output a viewer reward value for each viewer on the basis of a value obtained by multiplying the viewer participation rate for each viewer and a reward amount.

The reward calculator 490 may calculate a streamer reward value and a total viewer reward value from the reward amount on the basis of the reward distribution rate between a streamer and a viewer.

The reward calculator 490 may distribute the reward amount into the streamer reward value and the total viewer reward value on the basis of the reward distribution rate between the streamer and the viewer.

The reward calculator 490 may calculate the viewer reward value for each viewer according to a value obtained by multiplying the total viewer reward value and the viewer participation rate for each viewer.

The reward calculator 490 may calculate and output the streamer reward value and the viewer reward value for each viewer.

The manager terminal 50 may access the streaming-based reward providing server 40, and according to a user's input, may input at least one of the destination location coordinate value, the intermediate time point setting period, the reward amount, and the reward distribution rate.

The streaming-based reward providing server 40 calculates a viewer participation rate for each viewer according to a viewing time for each viewer and a feedback reception time point for each viewer, between a time point when a trigger signal is generated upon receiving a signal from a streamer terminal and a time point at which a reward acquisition signal is generated as a streamer location coordinate value falls within an arrival confirmation radius, and calculates and outputs a viewer reward value for each viewer from a reward amount depending on the viewer participation rate for each viewer, so that rewards may be provided differentially according to viewer's participation.

The streaming-based reward providing server 40 provides the different reward values according to the viewer's participation, thereby having an advantage of increasing the viewer's participation rate according to the differential distribution of the rewards.

Figure 2A:
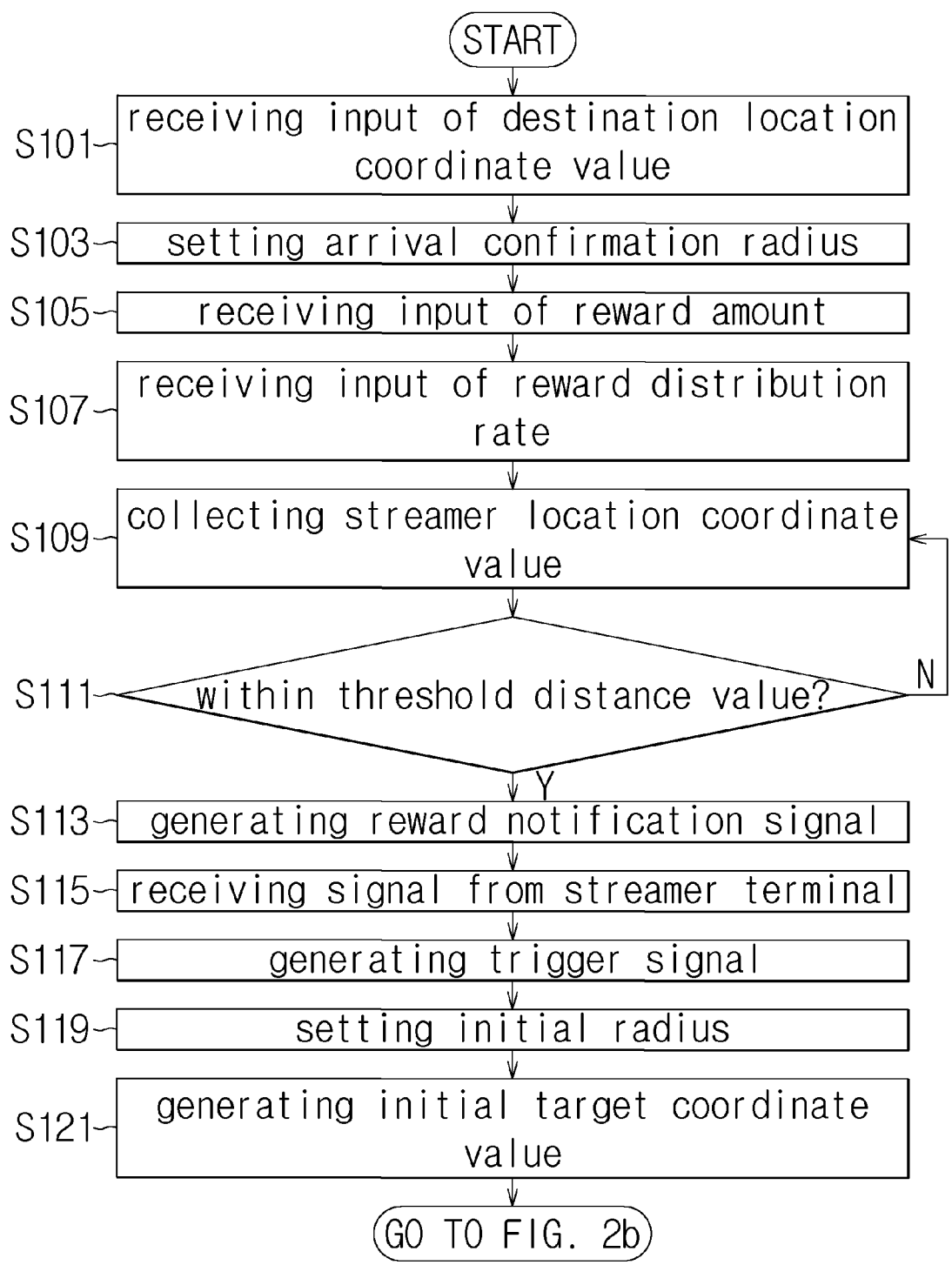
FIGS. 2a-2c is a flowchart of an example of a streaming-based reward providing method.
Figure 2B:
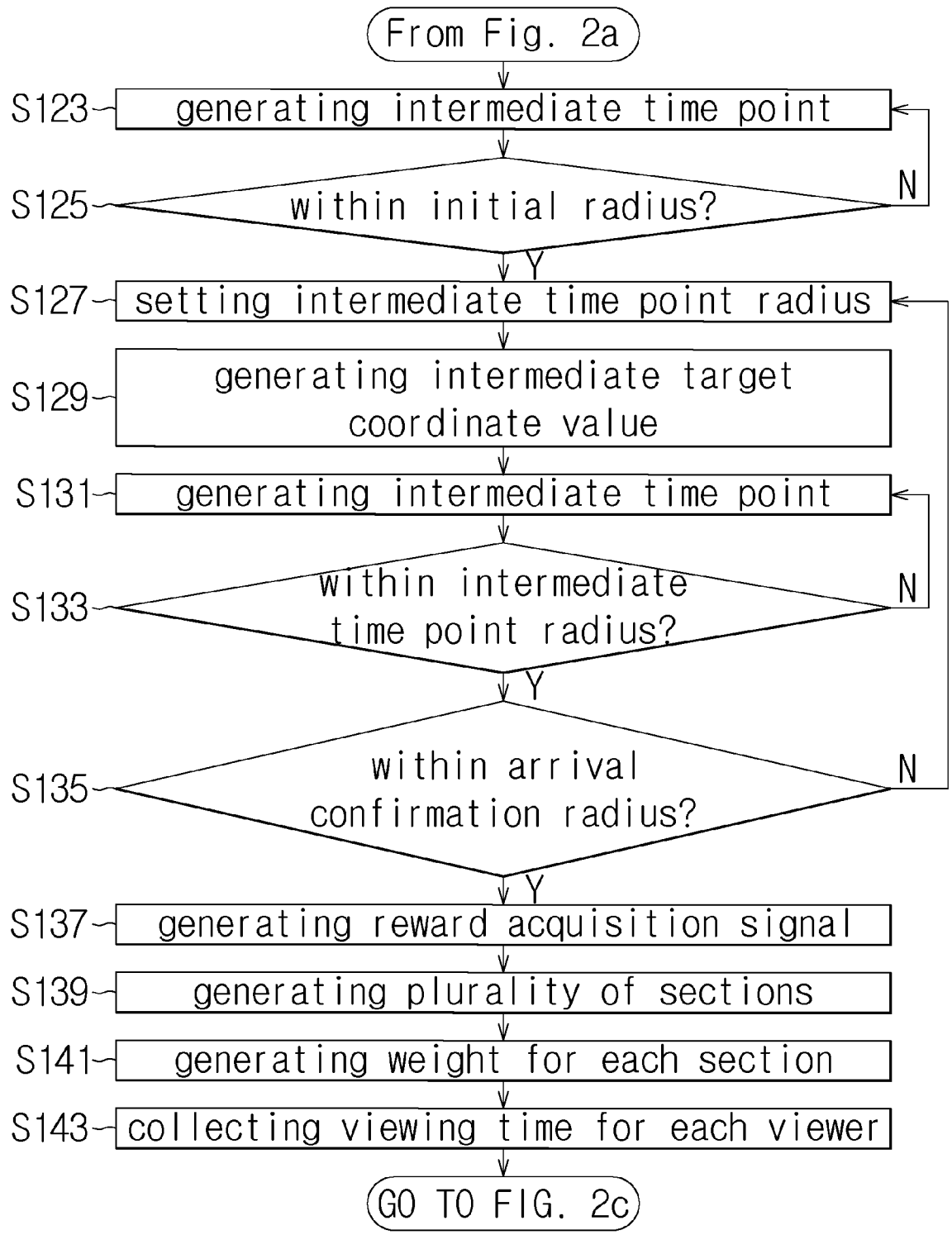
Figure 2C:
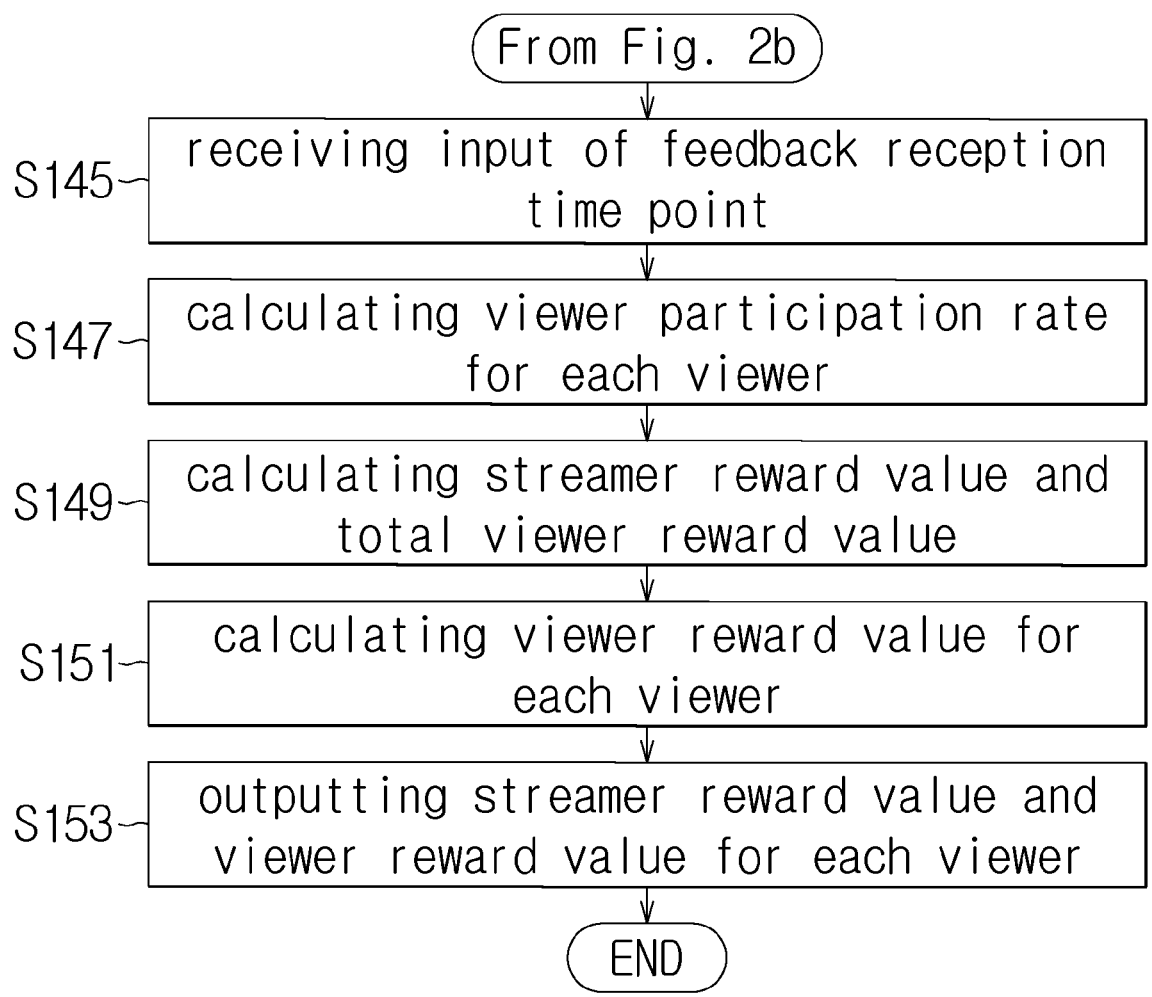

FIGS. 2a-2c is a flowchart of an example of the streaming-based reward providing method.

In FIGS. 2a-2c, the streaming-based reward providing method may include: operation S101 of receiving a destination location coordinate value according to a user's input;

operation S103 of setting an arrival confirmation radius having a radius of a threshold value preset based on the destination location coordinate value; operation S105 of receiving a reward amount according to the user's input; operation S107 of receiving a reward distribution rate, between a streamer and a viewer, according to the user's input; and operation S109 of collecting a streamer location coordinate value from a terminal performing streaming broadcast.

After the operation S109, the streaming-based reward providing method may further include: operation S111 of determining whether a separation distance between the streamer location coordinate value and the destination location coordinate value falls within a preset threshold distance value; and operation S113 of generating a reward notification signal when the separation distance between the streamer location coordinate value and the destination location coordinate value falls within the preset threshold distance value.

The streaming-based reward providing method may include the operations S111 to S113, so as to inform the existence of a reward to a streamer terminal performing streaming broadcast and having entered within the preset threshold distance value of the destination location coordinate.

After the operation S113, the streaming-based reward providing method may further include: operation S115 of receiving a signal from the streamer terminal according to a user's input of the streamer terminal performing streaming broadcast; and operation S117 of generating the trigger signal as the signal is received from the streamer terminal performing streaming broadcast.

After the operation S117, the streaming-based reward providing method may further include: operation S119 of setting an initial radius having a radius of a preset initial value at the time point when the trigger signal is generated; operation S121 of generating an initial target coordinate value corresponding to any one coordinate belonging to the initial radius from the destination location coordinate value after the time point when the trigger signal is generated; operation S123 of generating at least one intermediate time point every intermediate time point setting period from the time point when the trigger signal is generated; operations S125 of determining whether the streamer falls within the initial radius, on the basis of the separation distance between the streamer location coordinate value and the destination location coordinate value at the intermediate time point; operation S127 of setting the intermediate time point radius having a radius smaller than that of the initial radius; and operation S129 of generating an intermediate target coordinate value corresponding to any one coordinate falling within the intermediate time point radius from the destination location coordinate value when the intermediate time point is generated and the intermediate time point radius for the intermediate time point is set.

The streaming-based reward providing method performs operation S119 of setting the initial radius having the radius of the preset initial value at the time point when the trigger signal is generated, and performs operation S121 of generating the initial target coordinate value corresponding to any one coordinate belonging to the initial radius from the destination location coordinate value after the time point when the trigger signal is generated, so that the initial target coordinate value may be provided to the user of the streamer terminal.

The streaming-based reward providing method performs: operation S123 of generating an initial intermediate time point after the intermediate time point setting period from the time point when the trigger signal is generated; operation S125 of determining whether the separation distance between the streamer position coordinate value and the destination position coordinate value falls within the initial radius at the time point when the first intermediate point is generated; operation S127 of setting the intermediate time point radius having the radius smaller than that of the initial radius, when the separation distance between the streamer location coordinate value and the destination location coordinate value falls within the initial radius; and operation S129 of generating an intermediate target coordinate value corresponding to any one coordinate falling within the intermediate time point radius from the destination location coordinate value.

The streaming-based reward providing method performs: operation S131 of generating an intermediate time point according to the intermediate time point setting period; operation S133 of determining whether the streamer location coordinate value at the intermediate time point generated in the operation S131 falls within the preset intermediate time point radius from the destination location coordinate value; a operation of returning the process to the operation S131 of generating the intermediate time point, when the streamer location coordinate value does not fall within the preset intermediate time point radius from the destination location coordinate value; and operation S135 of determining whether the streamer location coordinate value falls within the arrival confirmation radius of the intermediate time point generated in the operation S131 when the streamer location coordinate value at the intermediate time point generated in the operation S131 falls within the preset intermediate time point radius from the destination location coordinate value.

The streaming-based reward providing method performs: operation S127 of resetting the intermediate time point radius by allowing the preset intermediate time point radius to have a radius reduced by a preset length, when the streamer location coordinate value does not fall within the arrival confirmation radius at the intermediate time point generated in the operation S131; and operation S137 of generating a reward acquisition signal, when the streamer location coordinate value falls within the arrival confirmation radius at the intermediate time point.

The streaming-based reward providing method may include: operation S137 of generating a reward acquisition signal when the streamer location coordinate value falls within the arrival confirmation radius; operation S139 of generating a plurality of sections by dividing an interval, between a time point when a trigger signal is generated and a time point when a reward acquisition signal is generated, by a preset intermediate time point setting period; operation S141 of generating a weight for each section, on the basis of the separation distance between the streamer location coordinate value and the destination location coordinate value, for each intermediate time point; operation S143 of collecting a viewing time for each viewer according to the viewer's use of video data for each of the plurality of sections; operation S145 of receiving a feedback reception time point for each user according to the user's input; and operation S147 of calculating a viewer participation rate for each viewer on the basis of the viewing time for each viewer or the feedback reception time point for each of the plurality of sections.

Operation S141 may generate a weight having a preset first weight value when the separation distance between the streamer location coordinate value and the destination location coordinate value at the intermediate time point is greater than or equal to a preset first distance value, generate a weight having a second weight value greater than the first weight value when the separation distance between the streamer position coordinate value and the destination location coordinate value at the intermediate time point falls within the first distance value and is greater than or equal to the second distance value smaller than the first distance value, and generate a weight having a third weight value greater than the second weight value when the separation distance between the streamer location coordinate value and the destination location coordinate value at the intermediate time point falls within the second distance value and is greater than or equal to the third distance value smaller than the second distance value.

Operation S147 may include: a operation of counting a viewing counting value having a preset initial value, so that the viewing counting value is increased by a preset value depending on whether a viewing time for each viewer for each of the plurality of sections exceeds a preset threshold value; a operation of calculating a viewing participation value for each viewer by accumulating a value obtained by multiplying, by each section, a weight for each section corresponding to each of the plurality of sections and the viewing counting value; and a operation of calculating a viewer participation rate for each viewer on the basis of a ratio between the maximum value among viewing participation values for each viewer and a viewing participation value of any one viewer.

Here, the threshold value may be set according to a value obtained by multiplying a preset ratio value and the intermediate time point setting period.

In another embodiment, operation S147 may include: a operation of counting a viewing counting value having a preset initial value, so that the viewing counting value is increased by a preset value depending on whether a viewing time for each viewer for each of the plurality of sections exceeds a preset threshold value; a operation of calculating a viewing participation value for each viewer by accumulating a value obtained by multiplying, by each section, a weight for each section corresponding to each of the plurality of sections and the viewing counting value; a operation of calculating a viewer participation rate for each viewer on the basis of a ratio of the maximum value among viewing participation values for each viewer and a viewing participation value of any one viewer; a operation of generating a feedback counting value for each section on the basis of the number of feedback reception time points for each viewer, the feedback reception time points belonging to each of the plurality of sections; a operation of calculating a feedback participation value for each viewer by accumulating a value obtained by multiplying, by each section, a weight for each section corresponding to each of the plurality of sections and the feedback counting value; and a operation of calculating the viewer participation rate for each viewer on the basis of a ratio of the maximum value among the viewer participation values and the viewing participation value of any one viewer, and a ratio of the maximum value among the feedback participation values for each viewer and the feedback participation value of any one viewer.

Here, the operation of calculating the viewer participation rate for each viewer, on the basis of the ratio between the maximum value among the viewing participation values for each viewer and the viewing participation value of any one viewer, and the ratio between the maximum value among the feedback participation values for each viewer and the feedback participation value of any one viewer, may calculate the viewer participation rate for each viewer terminal by way of adding: a value obtained by multiplying the preset first constant value by a ratio of the maximum value among the viewing participation values for each viewer and the viewing participation value of any one viewer; and a value obtained by multiplying the preset second constant value by a ratio of the maximum value among the feedback participation values for each viewer and the feedback participation value of any one viewer.

In the streaming-based reward providing method, the operation S147 of calculating the viewer participation rate for each viewer may calculate the viewer participation rate for each viewer on the basis of values including: the viewing participation value for each viewer calculated based on the viewing time for each viewer according to the viewer's use of the video data for each of the plurality of sections; and the feedback participation value for each viewer calculated based on the number of feedback reception time points for each viewer, the feedback reception time points belonging to each of the plurality of sections.

After the operation S147, the streaming-based reward providing method may include: operation S149 of calculating the streamer reward value and the total viewer reward value from the reward amount on the basis of a reward amount distribution rate between the streamer and the viewer; operation S151 of calculating the viewer reward value for each viewer according to the value obtained by multiplying the total viewer reward value by the viewer participation rate for each viewer terminal; and operation S153 of outputting the streamer reward value and the viewer reward value for each viewer.

The streaming-based reward providing method generates the plurality of sections by dividing the interval, between the time point when the trigger signal is generated upon receiving the signal from the streamer terminal and the time point when the streamer location coordinate value belongs to the arrival confirmation radius to generate the reward acquisition signal, calculates the viewing time for each viewer for each of the plurality of sections and the viewer participation rate for each viewer according to the feedback reception time point, and calculates and outputs the viewer reward value for each viewer on the basis of the value obtained by multiplying the viewer participation rate for each viewer and the reward amount, so that the rewards may be differentially provided depending on the viewer participation.

The streamer terminal 10, streaming server 20, viewer terminal 30, reward providing server 40, manager terminal 50, destination location coordinate value inputter 401, intermediate time point setting period inputter 402, reward amount inputter 403, reward distribution rate inputter 404, location coordinate value collector 405, reward notification signal generator 410, confirmation radius setter 420, trigger signal generator 431, intermediate time point generator 432, reward acquisition signal generator 440, radius setter 451, target coordinate value generator 452, coordinate information generator 461, viewing time collector 471, feedback reception time point collector 472, participation rate calculation module 480, reward calculator 490, section generator 481, weight generator 482, first counter 483, viewing participation value calculator 484, second counter 485, feedback participation value calculator 486, and participation rate calculator 487 in FIGS. 1-2c that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-2c that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A streaming-based reward providing server comprising:
   a destination location coordinate value inputter configured to receive a destination location coordinate value according to a user's input;
   a confirmation radius setter configured to set an arrival confirmation radius having a radius of a threshold value preset based on the destination location coordinate value;
   a reward amount inputter configured to receive a reward amount according to the user's input;
   a location coordinate value collector configured to collect a streamer location coordinate value from a terminal performing streaming broadcast;
   a trigger signal generator configured to generate a trigger signal upon receiving a signal from the terminal performing the streaming broadcast;
   a reward acquisition signal generator configured to generate a reward acquisition signal when the streamer location coordinate value falls within the arrival confirmation radius;
   a participation rate calculation module configured to calculate a viewer participation rate for each viewer, on the basis of a viewing time for each viewer according to viewer's use of video data in a plurality of sections generated by dividing an interval, between a time point when the trigger signal is generated and a time point when the reward acquisition signal is generated, by a preset intermediate time point setting period; and
   a reward calculator configured to calculate and output a viewer reward value for each viewer on the basis of a value obtained by multiplying the viewer participation rate for each viewer and the reward amount.

2. The streaming-based reward providing server of claim 1, further comprising:
   a viewing time collector configured to collect the viewing time for each viewer according to the viewer's use of the video data for each of the plurality of sections,
   wherein the participation rate calculation module comprises:
   a section generator configured to generate the plurality of sections by respectively dividing intervals into each section, the intervals including an interval between the time point when the trigger signal is generated and a time point when a first intermediate time point is firstly generated, an interval between the first intermediate time point and a second intermediate time point generated after the first intermediate time point, and an interval between the time point when the reward acquisition signal is generated and the second intermediate time point generated just before the time point when the reward acquisition signal is generated; and
   a participation rate calculator configured to calculate the viewer participation rate for each viewer on the basis of the viewing time for each viewer for each of the plurality of sections.

3. The streaming-based reward providing server of claim 2, further comprising:
   a feedback reception time point collector configured to receive each feedback reception time point for each viewer according to the user's input,
   wherein the participation rate calculator calculates the viewer participation rate for each viewer on the basis of the viewing time for each viewer for each of the plurality of sections and the number of feedback reception time points for each viewer, the feedback reception time points belonging to each of the plurality of sections.

4. The streaming-based reward providing server of claim 1, further comprising:
   an intermediate time point generator configured to generate at least one intermediate time point in each intermediate time point setting period from the time point when the trigger signal is generated;
   a radius setter configured to set an initial radius having a radius of a preset initial value at the time point when the trigger signal is generated, and set an intermediate time point radius having a radius smaller than the radius of the initial radius, on the basis of a separation distance between the streamer location coordinate value and the destination location coordinate value for each intermediate time point; and
   a target coordinate value generator configured to generate an initial target coordinate value corresponding to any one coordinate belonging to the initial radius from the destination location coordinate value after the time point when the trigger signal is generated, and generate and output an intermediate target coordinate value, corresponding to any one coordinate falling within the intermediate time point radius, from the destination location coordinate value when the intermediate time point is generated by the intermediate time point generator and the intermediate time point radius corresponding to the intermediate time point is set in the radius setter.

5. The streaming-based reward providing server of claim 1, further comprising:
   a reward distribution rate inputter configured to receive a reward distribution rate between a streamer and a viewer according to the user's input,
   wherein the reward calculator calculates a streamer reward value and a total viewer reward value from the reward amount on the basis of a reward amount distribution rate between the streamer and the viewer, calculates the viewer reward value for each viewer according to a value obtained by multiplying the total viewer reward value by the viewer participation rate for each viewer, and outputs the streamer reward value and the viewer reward value for each viewer.

6. A streaming-based reward providing system comprising:
   a streamer terminal configured to film a video according to a user's input and transmit video data, generated by the filming of the video, to outside;
   a viewer terminal configured to transmit a streaming request signal to receive the video data by streaming, and transmit feedback on the video data;
   a streaming server configured to receive and store the video data from the streamer terminal, receive the streaming request signal from the viewer terminal to detect a viewing time for each viewer as the video data is provided to the viewer terminal, and detect a feedback reception time point for each viewer as the feedback is received from the viewer terminal; and
   a reward providing server configured to receive a destination location coordinate value and a reward amount according to the user's input, set an arrival confirmation radius having a radius of a threshold value preset based on the destination location coordinate value, collect a streamer location coordinate value from the streamer terminal, generate a trigger signal as a signal is received from the streamer terminal, generate a reward acquisition signal when the streamer location coordinate value falls within the arrival confirmation radius, calculate a viewer participation rate for each viewer on the basis of the viewing time for each viewer, according to viewer's use of the video data, in a plurality of sections generated by dividing an interval, between a time point when the trigger signal is generated and a time point when the reward acquisition signal is generated, by an intermediate time point setting period, and calculate and output a viewer reward value for each viewer on the basis of a value obtained by multiplying the viewer participation rate for each viewer and the reward amount.

7. The streaming-based reward providing system of claim 6, wherein the reward providing server comprises:
a destination location coordinate value inputter configured to receive the destination location coordinate value according to the user's input;
a confirmation radius setter configured to set the arrival confirmation radius having the radius of the threshold value preset based on the destination location coordinate value;
a reward amount inputter configured to receive the reward amount according to the user's input;
a location coordinate value collector configured to collect the streamer location coordinate value from a terminal performing streaming broadcast;
a trigger signal generator configured to generate the trigger signal upon receiving a signal from the terminal performing the streaming broadcast;
a reward acquisition signal generator configured to generate the reward acquisition signal when the streamer location coordinate value falls within the arrival confirmation radius;
a participation rate calculation module configured to calculate the viewer participation rate for each viewer, on the basis of the viewing time for each viewer according to the viewer's use of the video data in the plurality of sections generated by dividing the interval, between the time point when the trigger signal is generated and the time point when the reward acquisition signal is generated, by the preset intermediate time point setting period; and
a reward calculator configured to calculate and output the viewer reward value for each viewer on the basis of the value obtained by multiplying the viewer participation rate for each viewer and the reward amount.

8. The streaming-based reward providing system of claim 7, further comprising:
a viewing time collector configured to collect the viewing time for each viewer according to the viewer's use of the video data for each of the plurality of sections,
wherein the participation rate calculation module comprises:
a section generator configured to generate the plurality of sections by respectively dividing intervals into each section, the intervals including an interval between the time point when the trigger signal is generated and a time point when a first intermediate time point is firstly generated, an interval between the first intermediate time point and a second intermediate time point generated after the first intermediate time point, and an interval between the time point when the reward acquisition signal is generated and the second intermediate time point generated just before the time point when the reward acquisition signal is generated; and a participation rate calculator configured to calculate the viewer participation rate for each viewer on the basis of the viewing time for each viewer for each of the plurality of sections.

9. The streaming-based reward providing system of claim 8, further comprising:
a feedback reception time point collector configured to receive each feedback reception time point for each viewer according to the user's input,
wherein the participation rate calculator calculates the viewer participation rate for each viewer on the basis of the viewing time for each viewer for each of the plurality of sections and the number of feedback reception time points for each viewer, the feedback reception time points belonging to each of the plurality of sections.

10. The streaming-based reward providing system of claim 7, wherein the reward providing server further comprises:
an intermediate time point generator configured to generate at least one intermediate time point in each intermediate time point setting period from the time point when the trigger signal is generated;
a radius setter configured to set an initial radius having a radius of a preset initial value at the time point when the trigger signal is generated, and set an intermediate time point radius, having a radius smaller than the radius of the initial radius, on the basis of a separation distance between the streamer location coordinate value and the destination location coordinate value for each intermediate time point; and
a target coordinate value generator configured to generate an initial target coordinate value corresponding to any one coordinate falling within the initial radius from the destination location coordinate value after the time point when the trigger signal is generated, and generate and output an intermediate target coordinate value, corresponding to any one coordinate that falls within the intermediate time point radius, from the destination location coordinate value when the intermediate time point is generated by the intermediate time point generator and the intermediate time point radius corresponding to the intermediate time point is set in the radius setter.

11. The streaming-based reward providing system of claim 7, wherein the reward providing server further comprises:
a reward distribution rate inputter configured to receive a reward distribution rate between a streamer and a viewer according to the user's input,
wherein the reward calculator calculates a streamer reward value and a total viewer reward value from the reward amount on the basis of a reward amount distribution rate between the streamer and the viewer, calculates the viewer reward value for each viewer according to a value obtained by multiplying the total viewer reward value by the viewer participation rate for each viewer, and outputs the streamer reward value and the viewer reward value for each viewer.

12. A server comprising:
one or more processors configured to:
receive a destination location coordinate value according to a user's input;
set an arrival confirmation radius having a radius of a threshold value preset based on the destination location coordinate value;
receive a reward amount according to the user's input;

collect a streamer location coordinate value from a terminal performing streaming broadcast;

generate a trigger signal upon receiving a signal from the terminal performing the streaming broadcast;

generate a reward acquisition signal when the streamer location coordinate value falls within the arrival confirmation radius;

calculate a viewer participation rate for each viewer, on the basis of a viewing time for each viewer according to viewer's use of video data in a plurality of sections generated by dividing an interval, between a time point when the trigger signal is generated and a time point when the reward acquisition signal is generated, by a preset intermediate time point setting period; and calculate and output a viewer reward value for each viewer on the basis of a value obtained by multiplying the viewer participation rate for each viewer and the reward amount.

13. The server of claim 12, further comprising a memory configured to store instructions;

wherein the one or more processors are further configured to execute the instructions to configure the one or more processors to receive the destination location coordinate value according to the user's input, set the arrival confirmation radius having the radius of the threshold value preset based on the destination location coordinate value, receive the reward amount according to the user's input, collect the streamer location coordinate value from the terminal performing streaming broadcast, generate the trigger signal upon receiving the signal from the terminal performing the streaming broadcast, generate the reward acquisition signal when the streamer location coordinate value falls within the arrival confirmation radius, calculate the viewer participation rate for each viewer, on the basis of the viewing time for each viewer according to viewer's use of video data in the plurality of sections generated by dividing the interval, between the time point when the trigger signal is generated and the time point when the reward acquisition signal is generated, by the preset intermediate time point setting period, and calculate and output the viewer reward value for each viewer on the basis of the value obtained by multiplying the viewer participation rate for each viewer and the reward amount.

\* \* \* \* \*